A. F. FROUSSARD.
PISTON RING.
APPLICATION FILED MAY 1, 1919.

1,416,011. Patented May 16, 1922.

INVENTOR
A. F. Froussard
BY E. E. Hussman
ATTORNEY

UNITED STATES PATENT OFFICE.

ALBERT F. FROUSSARD, OF ST. LOUIS, MISSOURI.

PISTON RING.

1,416,011. Specification of Letters Patent. Patented May 16, 1922.

Application filed May 1, 1919. Serial No. 294,035.

*To all whom it may concern:*

Be it known that I, ALBERT F. FROUSSARD, a citizen of the United States of America, residing at the city of St. Louis, State of Missouri, United States of America, have invented certain new and useful Piston Rings, of which the following is such a full, clear, and exact description as will enable any one skilled in the art to which it appertains to make and use the same, reference being had to the accompanying drawings, forming part of this specification.

My invention relates to a piston ring or packing and particularly to a ring consisting of an annular base member provided with a channel in its periphery and a filler in said channel having its face flush with the face of the base member.

Figure 1:
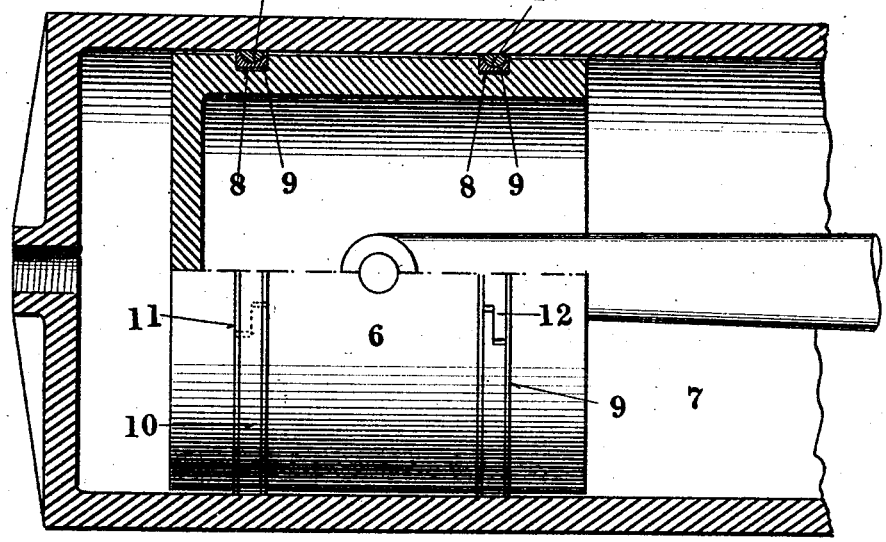
Figure 2:
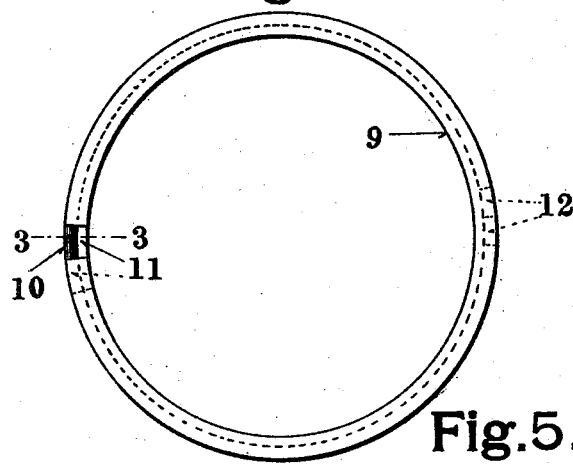
Figure 3:
Figure 4:
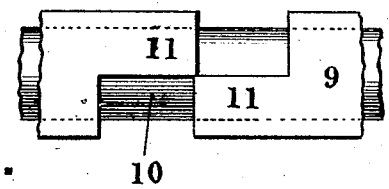
Figure 5:
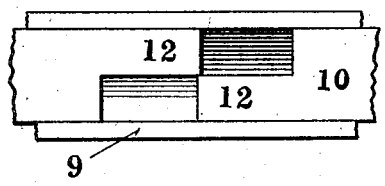

In the accompanying drawings, which illustrate one form of piston ring made in accordance with my invention together with a piston to which the same is applied, and a cylinder containing the piston, Figure 1 is a longitudinal section through the cylinder, the piston and rings being shown partly in section and partly in elevation, Figure 2 is a side view of the ring, Figure 3 is an enlarged section taken on the line 3—3 of Figure 2, Figure 4 is an enlarged view of a part of the ring looking from the inner side, and Figure 5 is an enlarged view of part of the periphery of the ring.

6 indicates a piston to which the rings are applied and 7 the cylinder containing the piston. The piston 6 is provided with two grooves 8 in the usual manner, each adapted to receive a piston ring or packing. Each packing consists of a base member 9 provided in its periphery with a channel of semi-circular cross section, and a filler 10 situated in said channel with its face flush with the face of the member. The member 9 consists of a split ring the ends of which are cut away to leave overlapping parts 11. In rings of three or four inches in diameter, I find one fourth of an inch to be about the proper length for these overlapping ends. When the ring is not under compression the ends should be about in alinement as shown in Figure 4 of the drawings. But when the ring is under compression as shown in Figure 1 the end pieces 11 should overlap throughout nearly their entire length. The filler 10 consists of a split ring and has its ends cut away to form overlapping parts 12 similar to the parts 11 but formed in reverse position to said parts so that the cuts in the two rings cannot be brought into alinement in any relative positions of the two rings.

I find that by providing the face member with a channel of semicircular cross section, the ring can be made much stronger than with a channel of angular cross section and that the two parts of the ring can be more readily assembled.

Having fully described my invention, what I claim as new and desire to secure by Letters Patent of the United States is:

1. A piston ring of substantially rectangular shape in cross section and having a channel in the cylinder bearing face of said ring, said channel having a curved face, and a spring member having a face to correspond with and fit within said channel, and an outer face to normally align with the cylinder engaging face of the ring.

2. A piston ring of substantially rectangular shape in cross section and having a channel of substantially semi-circular shape in the cylinder bearing face of such ring, and a spring member having a face to correspond with and fit within said channel, and an outer face to normally align with the cylinder engaging face of the ring.

In testimony whereof, I have hereunto set my hand and affixed my seal.

ALBERT F. FROUSSARD. [L. S.]